United States Patent [19]
Richley

[11] Patent Number: 5,900,192
[45] Date of Patent: May 4, 1999

[54] METHOD AND APPARATUS FOR FABRICATING VERY SMALL TWO-COLOR BALLS FOR A TWISTING BALL DISPLAY

[75] Inventor: Edward A. Richley, Palo Alto, Calif.

[73] Assignee: Xerox Corporation, Stamford, Conn.

[21] Appl. No.: 09/005,372

[22] Filed: Jan. 9, 1998

[51] Int. Cl.[6] ............................................. B29B 9/10
[52] U.S. Cl. ........................... 264/8; 264/5; 425/6; 425/8
[58] Field of Search ................................. 264/5, 8, 9, 10, 264/13, 12; 425/6, 8

[56] References Cited

U.S. PATENT DOCUMENTS

| | | |
|---|---|---|
| Re. 29,742 | 8/1978 | Tung . |
| 745,276 | 11/1903 | Cooley ........................................ 264/10 |
| 2,326,634 | 8/1943 | Gebhard et al. . |
| 2,354,018 | 7/1944 | Heltzer et al. . |
| 2,354,048 | 7/1944 | Palmquist . |
| 2,354,049 | 7/1944 | Palmquist . |
| 2,407,680 | 9/1946 | Palmquist et al. . |
| 2,600,963 | 6/1952 | Bland . |
| 2,684,788 | 7/1954 | Bland . |
| 2,794,301 | 6/1957 | Law et al. . |
| 2,950,985 | 8/1960 | Duval d'Adrian . |
| 2,965,921 | 12/1960 | Bland . |
| 2,980,547 | 4/1961 | Duval d'Adrian . |
| 3,150,947 | 9/1964 | Bland . |
| 3,222,204 | 12/1965 | Weber et al. . |
| 3,243,273 | 3/1966 | Bland . |
| 3,310,391 | 3/1967 | Law . |
| 3,617,333 | 11/1971 | Brown . |
| 3,648,281 | 3/1972 | Dahms et al. . |
| 3,795,435 | 3/1974 | Schwab . |
| 3,915,771 | 10/1975 | Gatzke et al. . |
| 4,002,022 | 1/1977 | Lopez . |
| 4,082,426 | 4/1978 | Brown . |
| 4,117,192 | 9/1978 | Jorgensen . |
| 4,117,194 | 9/1978 | Barbe et al. . |
| 4,126,854 | 11/1978 | Sheridon . |
| 4,143,103 | 3/1979 | Sheridon . |
| 4,229,732 | 10/1980 | Hartstein et al. . |
| 4,256,677 | 3/1981 | Lee . |
| 4,261,653 | 4/1981 | Goodrich . |
| 4,264,641 | 4/1981 | Mahoney et al. ........................ 264/10 |

(List continued on next page.)

FOREIGN PATENT DOCUMENTS

| | | |
|---|---|---|
| 2161301 | 7/1973 | France . |
| 40 08 825 A1 | 3/1991 | Germany . |
| 53-57998 | 5/1978 | Japan . |
| 3-62827 | 3/1991 | Japan ....................................... 264/10 |

OTHER PUBLICATIONS

*Business Wire* (available through Dialog, File 610), "S.I.P. and ETIP to jointly develop the world's first eraseable and reusable paper for printing." Aug. 19, 1991.

*IEEE Grid*, Jan. 1996, pp. 17–20 (includes article entitled "Electric Paper: A Research Odyssey" and corresponding calendar listing at p. 19).

Philip Yam, "Plastics Get Wired," *Scientific American*, Jul. 1995, pp. 82–87.

(List continued on next page.)

*Primary Examiner*—Mathieu D. Vargot
*Attorney, Agent, or Firm*—Fay, Sharpe, Beall, Fagan, Minnich & McKee, LLP

[57] ABSTRACT

A bichromal ball includes a first hemisphere. The first hemisphere includes a first pigment having a first color and a first polarity. The first pigment is added to a carrier fluid and polymer mixture during formation of the bichromal ball. A second hemisphere includes a second pigment having a second color and a second polarity. The second pigment is added to the carrier fluid and polymer mixture during formation of the bichromal ball. The carrier fluid and polymer mixture have a lower viscosity than the polymer alone. The carrier fluid is substantially removed after the first and second hemispheres are formed. The polymer is left along with the first and second pigments which form the bichromal ball. A diameter of the bichromal ball is reduced after the carrier fluid is substantially removed.

10 Claims, 4 Drawing Sheets

U.S. PATENT DOCUMENTS

| | | |
|---|---|---|
| 4,267,946 | 5/1981 | Thatcher . |
| 4,268,413 | 5/1981 | Dabisch . |
| 4,288,788 | 9/1981 | Rogers et al. . |
| 4,299,880 | 11/1981 | Arens . |
| 4,367,920 | 1/1983 | Tung et al. . |
| 4,374,889 | 2/1983 | Arens . |
| 4,381,616 | 5/1983 | Saxer . |
| 4,418,098 | 11/1983 | Maistrovich . |
| 4,438,160 | 3/1984 | Ishikawa et al. . |
| 4,441,791 | 4/1984 | Hornbeck . |
| 4,492,435 | 1/1985 | Banton et al. . |
| 4,500,172 | 2/1985 | Gagnon et al. . |
| 4,511,210 | 4/1985 | Tung et al. . |
| 4,569,857 | 2/1986 | Tung et al. . |
| 4,592,628 | 6/1986 | Altman et al. . |
| 4,599,294 | 7/1986 | Matsumoto et al. ............ 264/8 |
| 4,613,076 | 9/1986 | Dietz et al. ................ 264/8 |
| 4,678,695 | 7/1987 | Tung et al. . |
| 4,688,900 | 8/1987 | Doane et al. . |
| 4,695,528 | 9/1987 | Dabisch et al. . |
| 4,710,732 | 12/1987 | Hornbeck . |
| 4,713,295 | 12/1987 | LaRoche . |
| 4,721,649 | 1/1988 | Belisle et al. . |
| 4,725,494 | 2/1988 | Belisle et al. . |
| 4,729,687 | 3/1988 | Arens . |
| 4,774,037 | 9/1988 | Hendricks ................ 264/9 |
| 4,810,431 | 3/1989 | Leidner . |
| 4,837,071 | 6/1989 | Tagoku et al. . |
| 4,877,253 | 10/1989 | Arens . |
| 4,890,902 | 1/1990 | Doane et al. . |
| 4,919,521 | 4/1990 | Tada et al. . |
| 4,948,232 | 8/1990 | Lange . |
| 4,956,619 | 9/1990 | Hornbeck . |
| 4,991,941 | 2/1991 | Kalmanash . |
| 4,994,204 | 2/1991 | Doane et al. . |
| 5,039,557 | 8/1991 | White . |
| 5,075,186 | 12/1991 | Sheridon . |
| 5,128,203 | 7/1992 | LaRoche . |
| 5,155,607 | 10/1992 | Inoue et al. . |
| 5,157,011 | 10/1992 | Okabe et al. . |
| 5,189,658 | 2/1993 | Moses . |
| 5,219,820 | 6/1993 | Morohoshi et al. . |
| 5,226,099 | 7/1993 | Mignardi et al. . |
| 5,249,000 | 9/1993 | Okabe et al. . |
| 5,251,048 | 10/1993 | Doane et al. . |
| 5,262,098 | 11/1993 | Crowley et al. . |
| 5,262,374 | 11/1993 | Okabe et al. . |
| 5,274,460 | 12/1993 | Yamada et al. . |
| 5,315,418 | 5/1994 | Sprague et al. . |
| 5,315,776 | 5/1994 | Strawbridge et al. . |
| 5,331,454 | 7/1994 | Hornbeck . |
| 5,344,594 | 9/1994 | Sheridon . |
| 5,354,598 | 10/1994 | Arens . |
| 5,363,222 | 11/1994 | Ledebuhr . |
| 5,383,008 | 1/1995 | Sheridon . |
| 5,384,067 | 1/1995 | Doane et al. . |
| 5,389,426 | 2/1995 | Arens et al. . |
| 5,389,945 | 2/1995 | Sheridon . |
| 5,397,503 | 3/1995 | Yuasa et al. . |
| 5,416,996 | 5/1995 | Clemens et al. . |
| 5,432,526 | 7/1995 | Hyatt . |
| 5,432,534 | 7/1995 | Maruyama et al. . |
| 5,459,602 | 10/1995 | Sampsell . |
| 5,469,020 | 11/1995 | Herrick . |
| 5,515,075 | 5/1996 | Nakagiri et al. . |
| 5,526,016 | 6/1996 | Nakagiri et al. . |
| 5,535,047 | 7/1996 | Hornbeck . |

OTHER PUBLICATIONS

*OEP(Office Equipment and Products)*, "Thermal Film Medium from Ricoh Permits Rewriting," Dec. 1993, p. 610.

Peter Tebbutt, "Now you see it . . . now you don't," *New Scientist*, May 30, 1992, p. 17.

J.D. Mosley, "Flexible LCD is lighter and thinner than glass," *EDN*, Oct. 31, 1985, p. 93.

A. Chiang, D. Curry and M. Zarzychi, "A Stylus Writable Electrophoretic Display Device," *SID 79 Digest*, 1979, pp. 44–45.

N.K. Sheridon and M.A. Berkovitz, "The Gyricon—A Twisting Ball Display," *Proceedings of the SID*, vol. 18/3 & 4, 1977, pp. 289–293.

R. Yamaguchi and S. Sato, "Light Scattering and Reflection Properties in Polymer Dispersed Liquid Crystal Cells with Memory Effects," *IEICE Trans. Electron*, vol. E 78 C No. 1, Jan. 1995, pp. 106–110.

Lawrence L. Lee, "A Magnetic Particles Display," *IEEE Transactions on Electron Devices*, vol. ED 22, No. 9, Sep. 1975, pp. 758–765.

Richard A. Strain, "Additive Color Mixture with Fluorescent Pigments and Special Illumination," *Color Research and Applications*, vol. 1, No. 3, Fall 1976, pp. 146–147.

M. Saitoh, T. Mori, R. Ishikawa and H. Tamura, "A Newly Developed Electrical Twisting Ball Display," *Proceeding of the SID*, vol. 23, No. 4, 1982, pp. 249–250.

R. Micheletto, H. Fukada and M. Ohtsu, "A Simple Method for the Production of a Two–Dimentional, Ordered Array of Small Latex Particles" *Langmuir*, vol. 11, No. 9, May 1995, pp. 3333–3336.

Deane B. Judd and Günter Wyszecki, *Color in Business, Science, and Industry* (2nd ed.), New York: John Wiley and Sons, Inc., 1967, pp. 387–405.

Wesley Wm. Wendlandt and Harry G. Hecht, *Reflectance Spectroscopy*, New York: Interscience Publishers, 1966, pp. 46–91, 253–275.

G. Chui, "A Page from the Future," San Jose Mercury News, Jun. 18, 1996, pp. 12E,11E.

J.L. Bruneel and F. Micherson, "Optical Display Device Using Bistable Electrets," *American Institute of Physics*, vol. 30, No. 8, Apr. 15, 1977, pp. 382–383.

Robert L. Saxe and Robert I. Thompson, "Suspended–Particle Devices," *Information Display*, Nos. 4 & 5, 1996, pp. 20–23.

Lars A. Yoder, "The TI Digital Light Processing Micromirror Tech: Putting It To Work Now," *Advanced Imaging*, Jun. 1996, pp. 43–46.

PCT International Search Report, Int'l. Appl. No. US97/10123, Int'l Filing Date Jun. 25, 1997.

METHOD AND APPARATUS FOR FABRICATING VERY SMALL TWO-COLOR BALLS FOR A TWISTING BALL DISPLAY

BACKGROUND OF THE INVENTION

The present invention relates to large-scale fabrication of small, two-color balls, approximately 12 μm in diameter, for use in an "electric paper" display sheet.

Typical electric paper displays are disclosed in U.S. Pat. Nos. 4,126,854 and 4,143,103, the subject matters of which are fully incorporated herein by reference. In general, such displays include an elastomeric host layer a few millimeters thick which is heavily loaded with hemispherically bichromal (i.e., two-color) balls. Each bichromal ball has hemispheres of contrasting colors, such as a white half and a black half. Upon application of an electrical field between electrodes located on opposite surfaces of the host layer, the balls rotate to present one or the other hemisphere to an observer, depending on the polarity of the field. The resolution of the electric paper is dependent upon the number and size of the bichromal balls loaded into the host layer. More specifically, loading a greater number of bichromal balls having smaller diameters (e.g., ≈12 μm) into the host layer produces an electric paper having a higher resolution. Therefore, it is desirable to produce large numbers of bichromal balls having such smaller diameters.

Heretofore, a typical method of creating bichromal balls has included the spinning disc method which is disclosed by Crowley et al. in U.S. Pat. No. 5,262,098, the subject matter of which is fully incorporated herein by reference.

Briefly, the spinning disc method includes introducing black and white pigmented, hardenable liquids to upper and lower surfaces, respectively, of a disc mounted on a rotatable spindle. The liquids are moved to the periphery of the disc by centrifugal force where they flow together, without mixing, to form bichromal "globs." The centrifugal force causes the bichromal globs to "break-away" from the disc, during a process referred to as "break-up."

Ideally, the globs break-away from the disc in the form of small, individual spherical balls which are substantially identical and have proper bichromal characteristics (i.e., one hemisphere contains the black pigment while the other hemisphere contains the white pigment). Although the spinning disc method is capable of producing a large number of bichromal balls in a relatively short period of time, a large percent of the balls produced are unacceptable. In other words, the balls are not substantially identical to each other (e.g., the diameter of one ball may be ≈12 μm while the diameter of another ball may be 80 μm or greater) and/or they do not have proper bichromal characteristics.

Bichromal balls are typically produced from various polymers (e.g., waxes or other resins), having pigment loadings of 25% to 50% by weight (or less than 12% by volume), heated to temperatures of approximately 500° C. to 600° C. The polymer/pigment combination is referred to as a slurry. The resulting viscosity of the molten slurry at these pigment loadings and temperatures typically ranges between about 15 centipoise and about 20 centipoise. At these viscosities, however, only about 10% of the slurry input to a spinning disc production system is output as bichromal balls having acceptable characteristics. In other words, approximately 90% of the bichromal balls produced by current methods are unacceptable.

One reason for the low yield of usable balls is "ligament snap-back." Ligament snap-back is a phenomenon which results when the balls break-away from the disc too slowly. Globs which should be dispensed from the disc are instead pulled-back in the axial direction by surface tension. These globs which have been pulled-back combine with one or more subsequent globs, thereby forming a single oversized glob and, consequently, an oversized ball. Oversized balls are frequently non-spherical and have improper bichromal surface characteristics. One way to prevent ligament snap-back is to decrease the viscosity of the polymer used to form the balls, thereby preventing the slurry from breaking-away from the disc too slowly. In this manner, the forces exerted by the viscosity of the slurry become insignificant relative to the forces exerted by surface tension.

Paraffin wax, which has a viscosity between about 5 centipoise and about 6 centipoise (i.e., lower than polymers previously used for creating the slurry), has been used for preventing ligament snap-back. However, paraffin wax has a relatively lower melting point than other polymers. Also, because of the lower viscosity, the pigments suspended within the paraffin wax tend to mix between the hemispheres during the formation of the balls. Therefore, the balls formed using paraffin wax also lack preferred bichromal characteristics.

Viscous forces are typically described in terms of "viscous length". Viscous length is defined as:

$$L_\eta = \frac{9\eta^2}{\gamma\rho} \tag{1}$$

where η represents the viscosity, γ represents the surface tension, and ρ represents the mass density of a fluid. Most fluids have densities around $10^3$ kgM$^{-3}$, and surface tensions of about 0.03 NM$^{-1}$. These two properties are remarkably similar among many fluids. Therefore, a comparison of $L_\eta$ among various fluids is primarily a comparison of their viscosities.

Proper break-up is obtained when the respective diameters $L_D$ of the balls which break-away from the disc are much larger than $L_\eta$. Since $L_D$ represents the diameter of a ball, it is also a measure of the distance between the centers of two sequential balls which have similar diameters. A somewhat quantitative measure of the quality of break-up can be obtained by comparing the characteristic time for break-up, $\tau_b$, with the characteristic time for snap-back, $\tau_c$. The ratio of these times then indicates the degree of competition between the forces for break-up and the forces for snap-back. It can be shown that:

$$\frac{\tau_b}{\tau_c} \approx \sqrt{\frac{L_\eta}{L_D}} \tag{2}$$

Proper break-up has been shown to occur when:

$$\frac{\tau_b}{\tau_c} \ll 1 \tag{3}$$

To satisfy Equation 3, the characteristic time for break-up must be significantly shorter than the characteristic time for snap-back. In other words, one glob must break-away from the disc before enough relative inertia is imparted to subsequent balls.

For slurries including low pigment loading, such as those currently used for producing twisting balls, the viscous length, $L_\eta$, is approximately 60 μm. As stated above, balls currently produced by the spinning disc method have diameters, $L_D$, of approximately 80 μm. It can be seen from Equation 2 that these values yield a ratio of break-up time to snap-back time, $\tau_b/\tau_c$, of approximately 0.866. Equation 3 indicates such conditions are not ideal for proper break-up conditions to occur. Therefore, it is evident proper break-up conditions do not occur when bichromal balls are fabricated from the slurries currently used.

To obtain even finer resolutions, it is desirable to produce bichromal balls having even smaller diameters (i.e., smaller values of $L_D$). However, Equation 2 shows that bichromal balls having a smaller diameter result in a relatively larger value for the ratio $\tau_b/\tau_c$, if the viscous length is held constant. Larger values of $\tau_b/\tau_c$ indicate a longer break-up time relative to the snap-back time. Such a result, as shown by Equation 3, is undesirable and will result in even fewer acceptable balls. Furthermore, bichromal balls having smaller diameters will require a higher percent of pigment loading in the polymer to obtain proper opacity. The increased pigment loading tends to increase the viscosity of the slurry and, hence, $L_\eta$, thus resulting in even higher values for the $\tau_b/\tau_c$ ratio.

The present invention provides a new and improved apparatus and method for producing large numbers of substantially spherical bichromal balls, having smaller diameters (i.e., ≈12 μm) and proper bichromal characteristics, which overcome the above-referenced problems and others.

SUMMARY OF THE INVENTION

A bichromal ball includes a first hemisphere. The first hemisphere includes a first pigment having a first color and a first polarity. The first pigment is added to a carrier fluid and polymer mixture during formation of the bichromal ball. A second hemisphere includes a second pigment having a second color and a second polarity. The second pigment is added to the carrier fluid and polymer mixture during formation of the bichromal ball. The carrier fluid and polymer mixture have a lower viscosity than the polymer alone. The carrier fluid is substantially removed after the first and second hemispheres are formed. The polymer is left along with the first and second pigments which form the bichromal ball. A diameter of the bichromal ball is reduced after the carrier fluid is substantially removed.

In accordance with one aspect of the invention, the polymer includes solid particles suspended in the carrier fluid.

In accordance with a more limited aspect of the invention, external heat is applied for boiling-off the carrier fluid and melting the solid polymer particles.

In accordance with another aspect of the invention, the carrier fluid is combustible and is burned-off whereby heat created from the burning carrier fluid melts the solid polymer particles.

One advantage of the present invention is that bichromal balls having smaller diameters with proper bichromal characteristics are formed.

Another advantage of the present invention is that it is possible to produce a large number of the bichromal balls in a relatively short time.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
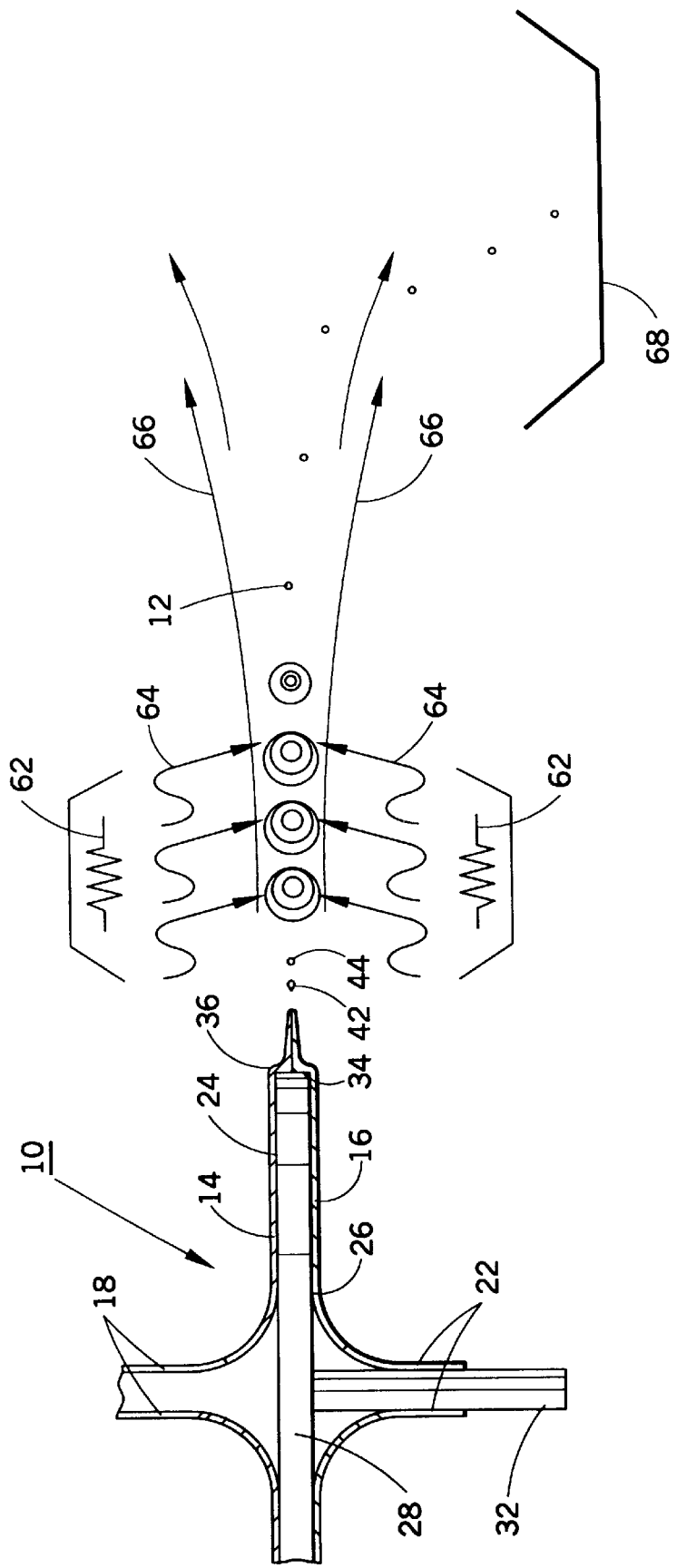
FIG. 1 is an apparatus for producing hemispherical bichromal balls.

FIG. 1 illustrates an apparatus 10 for producing hemispherical bichromal balls 12 for use in electric paper, twisting ball displays. Hardenable slurries 14, 16, of two different colors, are introduced via suitable dispensing nozzles 18, 22 to upper and lower surfaces 24, 26, respectively, of a disc 28 mounted upon a rotatable spindle 32. The slurries 14, 16 are preferably of contrasting colors, such as white and black, respectively, and will be described as such. However, it is to be understood the slurries could be of any two colors. The slurries 14, 16 are moved to the periphery 34 of the disc 28, on their respective sides, under the influence of centrifugal force. At the edge of the disc 28 they flow together (but do not mix) to form a peripheral side-by-side bichromal reservoir 36 from which ligaments extend. Distal ends of the ligaments dispense droplets 42. The droplets 42 form into a substantially spherical shape 44 soon after leaving the reservoir 36. Although it has been described to create droplets 42 using a spinning disc, it is to be understood that other methods of fabricating droplets, including the use of jets or jet sheets, are also contemplated.

Figure 2:
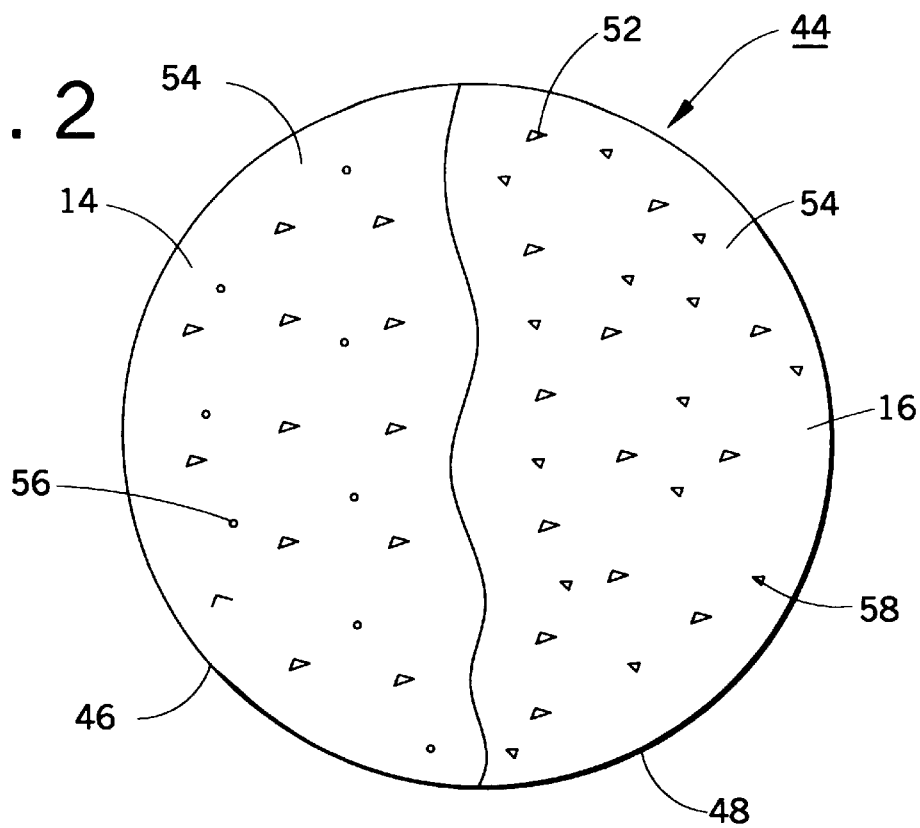
FIG. 2 is an enlarged view of the spherical droplet formed from the apparatus shown in FIG. 1.

FIG. 2 illustrates an enlarged view of the spherical droplet 44 formed from the apparatus 10. The droplet 44 includes two hemispheres 46, 48 made from the differently colored slurries 14, 16, respectively. The slurries 14, 16 contain a mixture of polymer particles 52 suspended in a carrier fluid 54. The polymer particles 52 typically have a viscosity between about 15 centipoise and about 20 centipoise. Although the polymer particles 52 are preferably a wax, other resins having similar viscosities are also contemplated. The carrier fluid 54 is preferably water. However, an alcohol or any of a variety of other low-viscosity liquids are also contemplated. White and black colored pigment particles 56, 58, respectively, are added to the polymer particle/carrier fluid mixture to produce the white and black colored slurries 14, 16, respectively. In this embodiment, the pigments 56, 58 are suspended in the mixture. The resultant slurries 14, 16 are of sufficient viscosities to produce a large number of droplets 42 having proper bichromal characteristics. The diameters of the spherical droplets 44 are approximately 80 μm, much greater than that of the desired diameter of approximately 12 μm. Therefore, the spherical droplets 44 are processed to produce the bichromal balls 12, which have the desired diameters while retaining the substantially spherical shape and bichromal characteristics of the spherical droplets 44.

In order to reduce the size of a ball from 80 μm to the desired size of 12 μm, the carrier liquid 54 is preferably boiled-off and the polymer particles 52 are melted. Preferably, the boiling point of the carrier fluid 54 is higher than the melting point of the polymer particles 52 so that it is possible for these two processes to be performed simultaneously. In this manner, applying enough heat to boil-off the carrier fluid 54 ensures there is enough heat to melt the polymer particles 52.

Referring again to FIG. 1, heating elements 62 apply the heat 64 to the spherical droplet 44 while the droplet 44 is in flight (e.g., during the first few milliseconds after it is discharged from the spinning disc apparatus 10). A forced gas 66 carries the spherical droplet 44 past the heating elements 62 at the proper velocity. Preferably, the gas 66 is air, nitrogen, or argon, although other inert gases are also contemplated. The temperature of the spherical droplet 44 does not exceed the boiling point of the carrier fluid 54 until the fluid 54 is completely boiled-off. The diameter of the spherical droplet 44 after the fluid 54 has been boiled-off and the polymer particles 52 have been melted (i.e., the diameter of the final bichromal ball 12) is dependent upon the concentration of polymer particles 52 and pigment particles 56, 58 contained in the slurry. It should be noted that the ratio of the amount of polymer particles 52 to the amount of the pigment particles 56, 58 may be adjusted without substantially affecting the viscous length $L_\eta$ of the slurries 14, 16. Once the carrier fluid 54 has been boiled-off and the polymer particles 52 have been melted, the final bichromal ball 12 is collected in a collection apparatus 68.

The velocity of the forced gas 66 controls the amount of time the spherical droplet 44 is exposed to the heat 64. If the spherical droplet 44 travels past the heating elements 62 too slowly, excess heat may be applied after the carrier fluid 54 is boiled-off. Consequently, the polymer particles 52 and/or the pigment particles 56, 58 could be destroyed by combustion or decomposition. Conversely, if the spherical droplet 44 travels past the heating elements 62 too quickly, not enough heat is applied to the spherical droplet 44. In this situation, the carrier fluid 54 is not completely boiled-off and the polymer particles 52 are not completely melted. Consequently, the diameter of the spherical droplet 44 is not reduced to the desired size.

Figure 3:
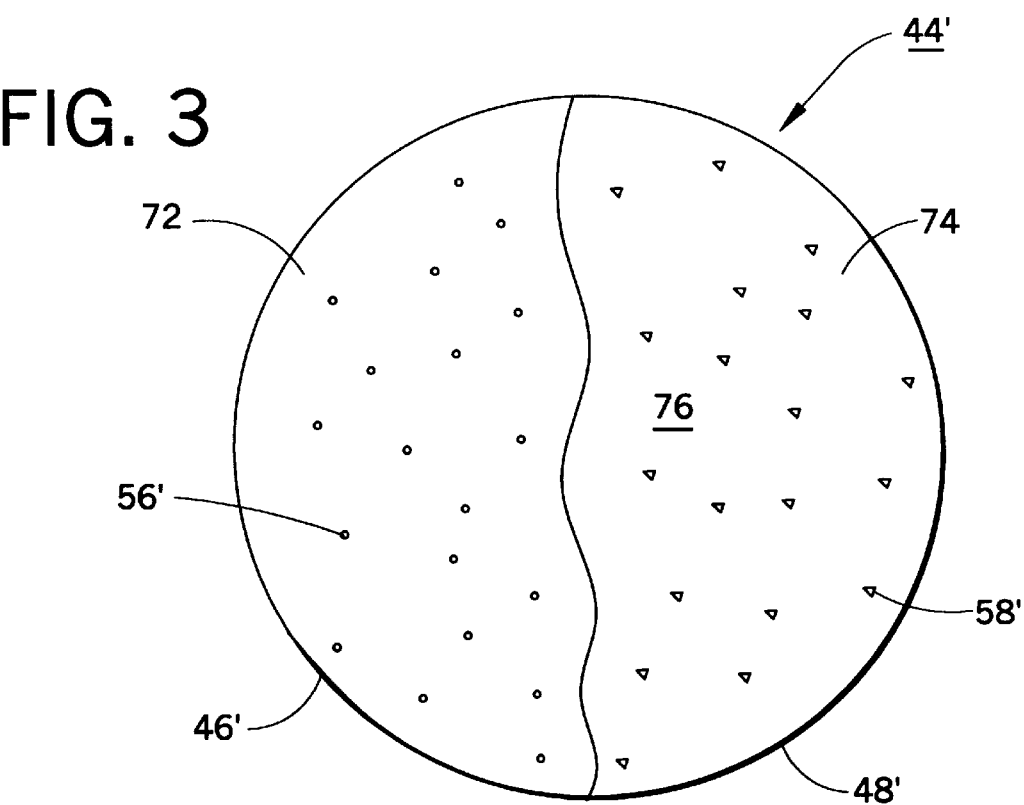
FIG. 3 is an enlarged view of a spherical droplet fabricated in a second embodiment of the present invention.

FIG. 3 illustrates an enlarged view of a spherical droplet used in a second embodiment of the present invention. For ease of understanding this embodiment, like components are designated by like numerals with a primed (') suffix and new components are designated by new numerals. Like the first embodiment, the spherical droplet 44' includes two hemispheres 46', 48'. However, in this embodiment the hemispheres are made from differently colored solvents 72, 74, respectively. More specifically, the solvents 72, 74 contain a solution 76 of a polymer and a carrier fluid along with white and black colored pigment particles 56', 58', respectively. Preferably, the carrier fluid dissolves 3% polyamide resin particles to create a low-viscosity solution 76. However, other polymer particles, and even liquid polymers, which are mixed into the carrier fluid to produce the low-viscosity solution 76, are also contemplated. It is preferable in this embodiment that the carrier fluid be non-combustible. However, flammable carrier fluids, such as n-butyl alcohol, are also contemplated. The pigment particles 56', 58', which are suspended in the solution 76, are not dissolved by the carrier fluid.

Figure 4:
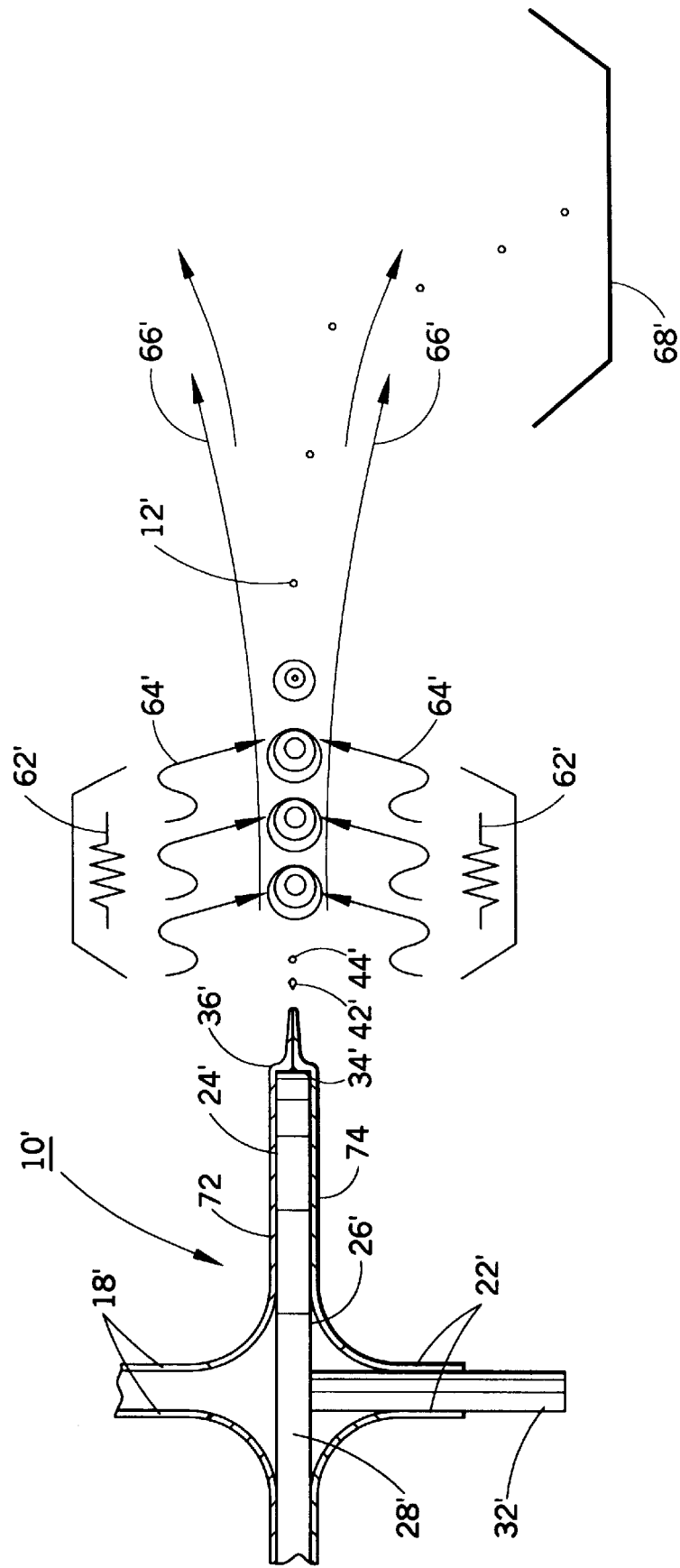
FIG. 4 is a spinning disc apparatus which produces the droplet shown in FIG. 3.

FIG. 4 illustrates a spinning disc apparatus 10' which produces the droplets 44'. The diameter of the spherical droplet 44' during the first few milliseconds after it is discharged from the reservoir 36' is approximately 80 $\mu$m. A forced gas 66' carries the spherical droplet 44' past heating elements 62' as described above for FIG. 1. The heating elements 62' generate heat 64' for boiling-off liquid portions of the solvents 72, 74 of the spherical droplet 44'. The diameter of the spherical droplet 44' after the solvents 72, 74 have been boiled-off (i.e., the diameter of the final bichromal ball 12') is dependent upon the concentration of polymer and pigment particles 56', 58' contained in the solvents 72, 74. Preferably, the concentrations are adjusted to produce bichromal balls 12' having diameters of approximately 12 $\mu$m. Once the liquid portions of the solvents 72, 74 have been boiled-off, the final bichromal ball 12' is collected in a collection apparatus 68'.

Figure 5:
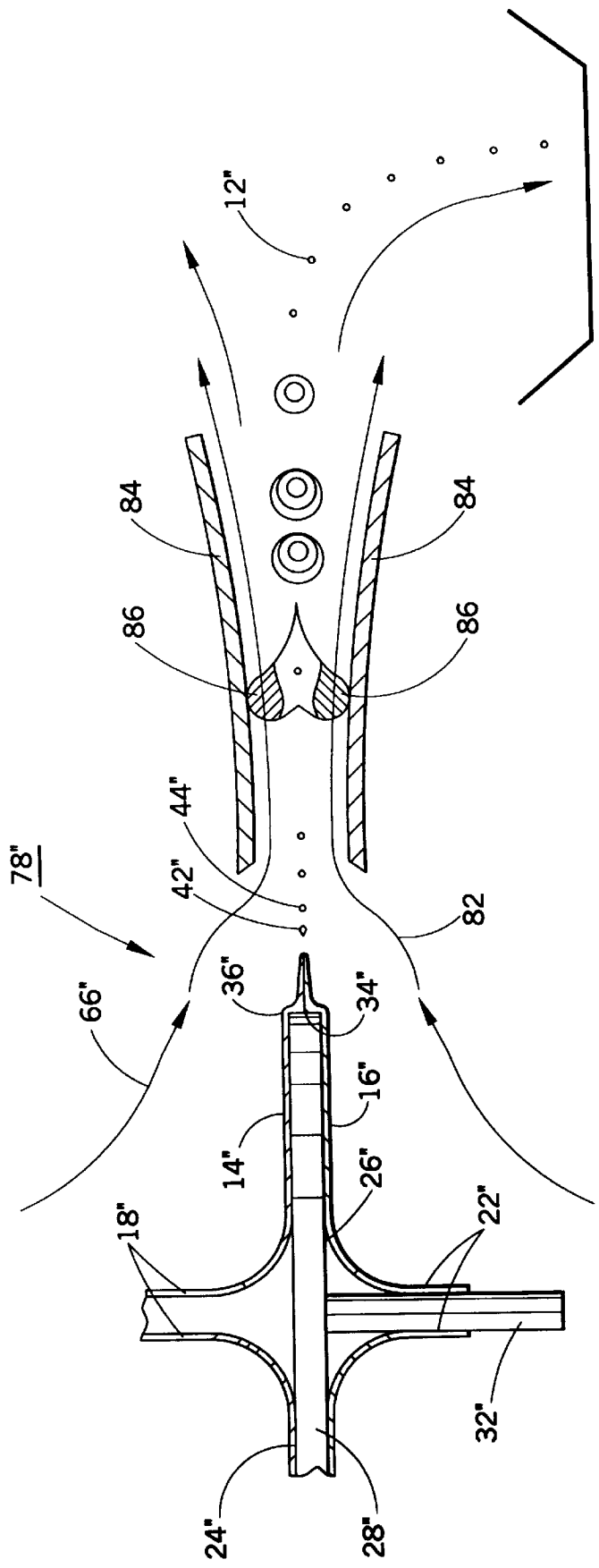
FIG. 5 is an apparatus used in a third embodiment of the present invention.

FIG. 5 illustrates an apparatus for producing bichromal balls used in a third embodiment of the present invention. For ease of understanding this embodiment, like components are designated by like numerals with a double-primed (") suffix and new components are designated by new numerals. The apparatus 78 produces spherical droplets 44" in a similar manner to that described above for FIGS. 1 and 2. More specifically, the spherical droplets 44" comprise a carrier liquid in which polymer particles and pigment particles are suspended. In this embodiment, the carrier fluid is an n-butyl alcohol, which has a boiling point of 118° C., or other combustible substance. As described above for FIGS. 1 and 2, the diameter of the spherical droplet 44" during the first few milliseconds after it is discharged from the reservoir 36" is approximately 80 $\mu$m.

A forced inert gas 66" and an ignited combustible fuel 82 carries the spherical droplet 44" through a shroud 84. While in the shroud 84, the combustible carrier fluid is burned-off. During the burning process as flame 86 is created which raises the temperature of the spherical droplet 44" sufficiently to melt the polymer particles, thereby forming the bichromal ball 12". One advantage of this embodiment is that the process is "self-regulating." More specifically, once the combustible carrier fluid has been burned-off, the flame (and, consequently, the heat source) is extinguished. The diameter of the spherical droplet 44" after the fluid has been burned-off and the polymer particles have been melted (i.e., the diameter of the final bichromal ball 12") is dependent upon the concentration of polymer particles and pigment particles contained in the carrier liquid. Preferably, the concentrations are adjusted so that the diameter of the bichromal ball 12" is approximately 12 $\mu$m.

In a fourth embodiment of the present invention, spherical droplets similar to those shown in FIG. 3 are produced and processed in the apparatus shown in FIG. 5. Different hemispheres are fabricated from differently colored solvents, which contain a solution of a polymer and a combustible carrier fluid (e.g., n-butyl alcohol) along with white and black colored pigment particles. Once a spherical droplet is formed, it is ignited and passed through the shroud of the apparatus shown in FIG. 5. In this manner, the combustible carrier fluid is burned-off, thereby producing a ball having proper bichromal characteristics and the desired diameter.

It is to be understood that the final ball size in any of the above embodiments is varied independently from the ball size at the time of break-up. Furthermore, the concentration of polymer and pigment determines the size and composition of the final ball.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method for fabricating bichromal balls, comprising:
    mixing a polymer having a first viscosity with a carrier fluid having a second viscosity to form a hardenable mixture having a third viscosity;

separating the mixture into a first part and a second part;

adding a first colored pigment to the first part of the mixture to form a first slurry;

adding a second colored pigment to the second part of the mixture to form a second slurry;

flowing the first and second slurries over opposite surfaces of a separator member and toward an edge thereof so that the slurries arrive at the edge at substantially the same flow rate;

forming a reservoir of the first and second slurries outboard of the edge, the reservoir including side-by-side regions of the first and second slurries;

propelling the first and second slurries out of the reservoir as a plurality of bichromal ligaments having side-by-side portions of different colors;

causing a distal end of each ligament to become unstable and to break-up into droplets;

removing the carrier fluid from the droplets using radiant heat and forming substantially spherical balls, each of the spherical balls comprising hemispheres of different colors, a diameter of each spherical ball being less than a diameter of the droplet; and collecting the bichromal balls.

2. The method for fabricating bichromal balls according to claim 1, wherein the polymer includes solid particles suspended in the carrier fluid, the step of removing the carrier fluid including:

applying the radiant heat to boil-off the carrier fluid, heat generated by the boiling carrier fluid melting the solid polymer particles.

3. The method for fabricating bichromal balls according to claim 1, wherein the carrier fluid dissolves the polymer to form a solvent, the step of removing the carrier fluid including:

applying the radiant heat to boil-off the carrier fluid.

4. The method for fabricating bichromal balls according to claim 1, wherein the carrier fluid is a combustible and the polymer includes solid particles suspended in the carrier fluid, the step of removing the carrier fluid including:

supplying the radiant heat for burning-off the carrier fluid with combustion, heat generated by the burning carrier fluid melting the solid polymer particles.

5. The method for fabricating bichromal balls according to claim 1, wherein the carrier fluid is a combustible and dissolves the polymer to form a solvent, the step of removing the carrier fluid including:

supplying the radiant heat for burning-off the carrier fluid with combustion.

6. An apparatus for fabricating bichromal balls from a slurry, having a first and a second part and including a polymer and a carrier fluid, the slurry being less viscous than the polymer, the first part of the slurry including a first colored pigment and the second part of the slurry including a second colored pigment, comprising:

a separator member having a first surface and a second surface located opposite the first surface and an edge region in contact with both the first and second surfaces;

means for flowing the first and second parts of the slurry over the first and second surfaces, respectively, toward the edge region so that the first and second parts of the slurry arrive at the edge at substantially the same flow rate and form a reservoir of the parts of the slurry outboard of the edge region, the reservoir including side-by-side regions of the first and second parts of the slurry;

means for propelling the first and second parts of the slurry out of the reservoir as a plurality of bichromal ligaments having side-by-side portions of different colors, a distal end of each ligament being unstable and breaking up into substantially spherical droplets, each droplet including hemispheres of differently colored slurries;

means for removing the carrier fluid using radiant heat and forming substantially spherical balls, each of the balls comprising hemispheres of different colors and having a diameter less than a diameter of the droplet from which it is formed; and means for collecting the bichromal balls.

7. The apparatus for fabricating bichromal balls according to claim 6, further including:

means for suspending solid particles, included in the polymer, in the carrier fluid;

wherein the means for removing supplies the radiant heat from an external source for boiling-off the carrier fluid and melting the solid polymer particles.

8. The apparatus for fabricating bichromal balls according to claim 6, further including:

means for suspending solid particles, included in the polymer, in the carrier fluid, the carrier fluid including a combustible material;

wherein the means for removing supplies the radiant heat from an external source for causing the carrier fluid to ignite for burning-off the carrier fluid, heat created from the burning carrier fluid melting the solid polymer particles.

9. The apparatus for fabricating bichromal balls according to claim 6, further including:

means for dissolving the polymer in the carrier fluid;

wherein the means for removing applies the radiant heat from an external source for boiling-off the carrier fluid.

10. The apparatus for fabricating bichromal balls according to claim 6, further including:

means for dissolving the polymer in the carrier fluid, the carrier fluid being combustible;

wherein the means for removing supplies the radiant heat from an external source for causing the carrier fluid to ignite for burning-off the carrier fluid.

* * * * *